United States Patent [19]

Wallace

[11] Patent Number: 4,570,292
[45] Date of Patent: Feb. 18, 1986

[54] TUBULAR CORE FOR A SHIRRED CASING ARTICLE

[75] Inventor: Rodney L. Wallace, Brookfield, Ill.

[73] Assignee: Union Carbide Corporation, Danbury, Conn.

[21] Appl. No.: 561,229

[22] Filed: Dec. 14, 1983

[51] Int. Cl.[4] .............................................. A22C 13/02
[52] U.S. Cl. ........................................ 17/1 R; 17/41; 138/118.1; 138/121; 138/122; 428/36
[58] Field of Search ................. 17/41, 42, 49, 35, 1 R; 206/802; 428/36; 138/118.1, 121, 122; 53/576

[56] References Cited

U.S. PATENT DOCUMENTS

| | | | |
|---|---|---|---|
| 3,826,853 | 7/1974 | Levaco | 426/132 |
| 3,952,370 | 4/1976 | Greider | 17/41 |
| 4,202,075 | 5/1980 | Michel et al. | 17/41 |

FOREIGN PATENT DOCUMENTS

| | | |
|---|---|---|
| 1104528 | 2/1968 | United Kingdom . |
| 1167377 | 10/1969 | United Kingdom . |
| 1241210 | 8/1971 | United Kingdom . |

*Primary Examiner*—George F. Lesmes
*Assistant Examiner*—P. R. Schwartz
*Attorney, Agent, or Firm*—Roger Aceto

[57] ABSTRACT

A tubular core for use in fabricating a cored casing article, the core having its aft end portion provided with a plurality of spaced ramp-shaped elements which extend about the periphery of the aft end portion. The elements permit one-way loading of a shirred casing stick over the aft end and onto the core while resisting the axial growth of the casing stick in an aft direction.

7 Claims, 2 Drawing Figures

TUBULAR CORE FOR A SHIRRED CASING ARTICLE

BACKGROUND OF THE INVENTION

The present invention relates generally to shirred casing articles of the type wherein a length of shirred casing is carried on a tubular core member. More particularly, the invention relates to the core for such an article including means on the core for restraining an end of the casing with respect to the core member.

Shirred tubular casings are well known in the art. Such casings are extensively used in food processing to make a variety of sausage type products and in the packaging of larger food products, such as cooked and smoked hams and the like.

Briefly, during the shirring process, relatively long lengths of casing are shirred, by any one of several conventional techniques, to produce a relatively short, tubular strand or "stick" of shirred casing. Still further length reduction may be accomplished by subjecting the shirred casing to an axial compaction force. Depending on the size and length of the casing, the force applied to compact a shirred casing may exceed 1000 pounds or more.

The end result is that it is not uncommon for the final length of the shirred casing to be only about 1% of the length of the unshirred casing. That is, a one foot stick of shirred casing may contain 70 to 100, or more, feet of casing.

One drawback of these highly compact shirred casings sticks, is that the stick is resilient. It will begin to grow or elongate as soon as the compaction force is released. This growth is most rapid immediately after the stick is formed, and gradually diminishes over a period of time. Accordingly, this growth may continue for at least part of the time that the stick is being held in stock and prior to use.

This resiliency, and tendency of the stick to grow after compaction, is vexing, because a stick must be compacted to a shorter length in order to accommodate the expected longitudinal growth. Growth also has the effect of reducing the pack ratio of the stick.

Various methods have been tried, and are presently employed, to counteract the resiliency of shirred casing sticks. These include, for example, adjustments in compacting methods, and use of various capturing means for resisting stick growth.

The use of a tubular member or core in connection with shirred casing is also known. For example, the core can function merely as a carrier for the casing wherein the casing is transferred from this carrier to the stuffing horn for use. As an alternative, the core can function as a stuffing horn or as a sleeve which is fitted over the stuffing horn wherein the core, with its supply of casing, is mounted to the stuffing machine.

In a copending application of Mahoney et al., Ser. No. 363,851, filed Apr. 5, 1982, a use of the core is disclosed wherein the shirred casing is so highly compacted about the core, that there is a tight frictional engagement between the core and casing. This engagement results from the inward expansion of the compacted casing against the core. Provided the core is strong enough to resist the forces exerted by the highly compacted casing, the cored casing article as disclosed in said Mahoney et al. application will exhibit a higher than conventional pack ratio. However, the ends of the casing are still free to expand along the core. One object of the present invention is to provide means to resist such expansion.

In cored casing articles wherein the casing is highly compacted and in tight frictional engagement about the core it is most convenient to mount the core to the stuffing machine for use as a stuffing horn or as a sleeve fitted over the stuffing horn. However, in spite of the tight frictional engagement between the core and casing, there is a tendency for the ends of the casing to grow or expand longitudinally along the core while the article is in storage. It is important that such growth, particularly in an aft direction be restricted as much as possible, prior to use. Otherwise, the expanded casing may interfere with the attachment of the core aft end to the stuffing machine. Thus, while it is desirable to put the longest stick possible onto a core of a given length, it is important also to keep the end of the stick a safe distance away from the aft end of the core.

Washers or the like can be applied to the core after the casing has been loaded, but this adds steps to the manufacturing sequence. Accordingly, a desirable feature is to provide a restraint for the end of the casing, as described above, without otherwise interfering with the loading of the casing onto the core or unduly complicating or prolonging the manufacturing of the cored article.

The present invention provides a restraining means integral the core which, not only is effective to restrain the longitudinal growth of the casing end but which also allows the casing to be loaded onto the core over the restraining means.

SUMMARY OF THE INVENTION

The present invention may be characterized in one aspect thereof, by a tubular core for carrying a shirred casing stick tightly engaged about the outer surface of the core, the core being suitable for use as a sleeve mounted over a stuffing horn or as a disposable stuffing horn. The core has a fore end over which casing is deshirred from the shirred stick and an aft end. A portion of the core adjacent the aft end has a casing restraining profile formed by one or more restraining elements spaced along and disposed about the aft end portion, the elements establishing an effective outside diameter which permits loading of the shirred casing onto the core over the aft end while presenting a surface oriented to resist axial growth of the shirred casing along the core in an aft direction.

DESCRIPTION OF THE PREFERRED EMBODIMENT

Figure 1:
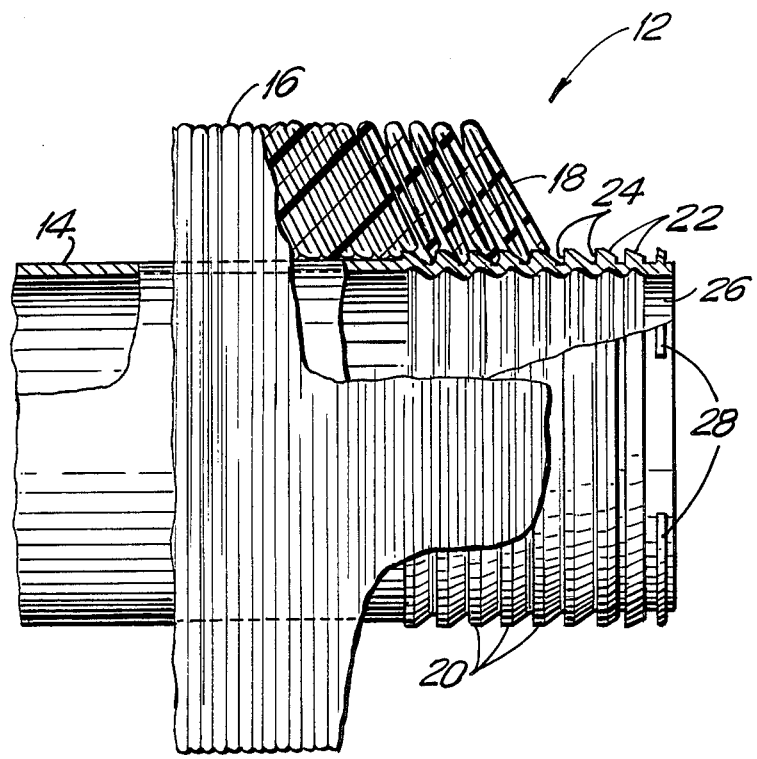
FIG. 1 is a view, partly broken away and in section showing the aft end of a cored casing article wherein the tubular core of the article incorporates the casing restraining means of the present invention.

Referring to the drawings, FIG. 1 shows an aft end portion 12 of a tubular core 14.

Carried by the core is a shirred casing stick 16. Only a portion of the stick is shown and it should be understood that the casing stick extends along the core towards the far end of the core (not shown) which would be to the left as viewed in FIG. 1.

As illustrated in the Figure, the shirring process lays the casing pleats at an angle to the longitudinal axis of the casing stick 16. For purposes of orientation, the last pleats shirred are at the stick end 18 while the first shirred would be at the opposite end. In this configuration, the first pleat shirred would be the first pleats deshirred in the stuffing operation.

The aft end portion 12 has a serrated profile formed by at least one and preferably by a plurality of individual restraining elements 20 spaced along the aft end portion. Each element 20 has a ramped surface 22 and a more vertically oriented surface 24. Each ramped surface 22 is slanted upward in a direction away from the aft end 26 of the core to facilitate passage of the shirred stick over the aft end and onto the core. The more vertically oriented surface 24, however, provides a ratchet effect to resist movement or longitudinal growth of the shirred casing stick in the opposite direction.

The elements 20 are annular in that they extend around the outer periphery of the aft end portion of this tube. Accordingly, the elements can be separate elements fixed to the outer periphery of the tubular core or they can be formed integral the core, as shown, by blow molding.

The largest effective outside diameter as established by the restraining elements 20 is about the same as the outside diameter of the mandrel on which the casing is compacted. If this effective diameter is slightly larger than the mandrel, the natural resiliency of the casing stick will still allow the casing to be pushed over the aft end 26 and onto the core. If the effective diameter of restraining elements 20 is slightly less than the mandrel size, the natural resiliency of the casing stick will allow the casing to expand inward towards the core surface and against the vertically oriented surfaces 24 so the restraining elements will still be effective to resist movement or longitudinal growth of the shirred casing stick.

Completing the structure of the core are components 28 of a suitable connector means adapted to mate with complimentary components (not shown) of a stuffing machine. As shown in FIG. 1 components 28 are the male members of a bayonet connector. With this arrangement the tubular core, with its supply of casing, is simply fitted into place on the stuffing machine and rotated to lock the bayonet connection. While not discussed in detail herein, it should be appreciated that the tubular core can be fitted as a sleeve over the stuffing horn of the stuffing machine or it can function as the stuffing horn. In either case, it is anticipated that the tubular core will be a disposable item which is discarded after its supply of casing is exhausted.

When assembling the cored casing article, the tubular core 14 is axially aligned with the mandrel on which the casing is made. The casing stick is then pushed axially over the aft end 26 and on to the core. If desired, a compaction step can be performed with the casing on the core. In any event, when on the core, it is likely that the casing stick will begin both to elongate and to expand inward against the core. This growth is well documented in the prior art with respect to shirred casing sticks and need not be discussed in detail.

As the casing expands inward, it grips against the outer surface of core 14. As it grows longitudinally, the casing stick encounters the restraining surfaces 24 of the elements 20. It is likely, that the resiliency of the stick will permit it to grow longitudinally over a succession of the restraining elements 20, as shown. Eventually, the resistance to such growth presented by the increasing number of surfaces 24 which engage the casing stick will exceed the forces exerted by the elongating stick and will stop further growth.

It should be appreciated that the number and size of the elements 20 needed to restrain stick growth will vary depending upon various parameters such as the size of the casing, the type of casing, the diameter of the tubular core and the degree to which the casing is compressed. For example, for fibrous reinforced casing, sizes 6½ through 12 which range in size from a recommended stuffed diameter of about 4.15 inches to 6.67 inches, can be captured using only 4 to 8 elements spaced over about 1 to 1.5 inches of the aft end portion 12. The elements were sufficient to prevent growth of the casing stick up to the connection components 28 at the aft end 26 when using a core having an outside diameter of 2.6 inches with the effective outside diameter of the restraining elements being only about 0.2 inches larger. For smaller sizes of casing having a recommended stuffed diameter between 3.26 and 4.33 inches, shirred, compacted and loaded onto a core 2.28 inches in diameter, a series of elements having an effective diameter only 0.1 inch larger than the core was sufficient to prevent this growth.

Figure 2:
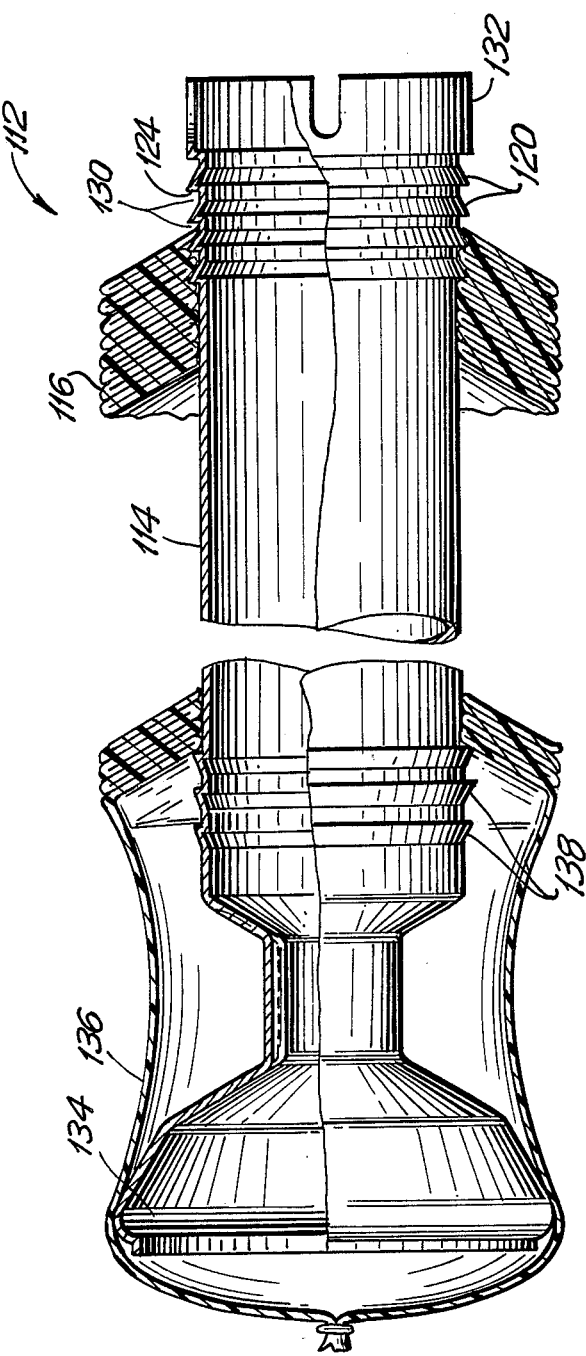
FIG. 2 is a sectional view showing another embodiment of a core as may incorporate the casing restraining means of the present invention.

The core 114 as shown in FIG. 2 has a slightly different configuration. Here the restraining elements 120 in aft portion 112 are spaced further apart than those of the FIG. 1 embodiment. The spaces between the restraining elements, as indicated at 130, provide more freedom for controlled growth of the casing stick between the restraining surfaces 124.

Rather than a bayonet connection, the tubular core of FIG. 2 has a split flange 132 at its aft end. This split flange is designed to fit over a stub horn (not shown) of a stuffing machine and is clamped in place by a quick release band or clamp. The fore end of the tubular core is provided with a sizing means 134. Sizing means for stretching or otherwise sizing the casing as the casing deshirrs over the sizing means is well known in the art. Preferably the sizing means 134 is formed integral the tubular core when the core is fabricated, such as by blow molding.

The one-piece configuration of the FIG. 2 tubular core, including a sizing means, restraining elements and connector, illustrates the advantage of having the core provided with the restraining elements according to the present invention. In this respect, the assembly of the cored casing article involves only the axial loading of the casing stick over the aft end and onto the core. Sizing means 134 at the fore end of the core can work to limit casing growth in that direction although as a practical matter, a length of this casing as shown at 136 is unshirred and pulled over the sizing means so it can be clipped closed. If desired, a set of restraining elements also can be provided at the fore end of the tubular core as shown at 138. These restraining elements 138 would be oriented to prevent excessive axial growth of the shirred stick in the forward direction.

Without the restraining elements which permit one-way loading of the casing from the aft end of the core, the casing stick would have to be loaded from the fore end. This requires keeping the sizing means separate until after the loading and then attaching the sizing means to the core.

Thus it should be appreciated that the one-way restraining means in accordance with present invention provides a tubular core which facilitates fabrication of cored casing articles. The ramped restraining elements and the serrated profile they provide permits a shirred casing stick to be easily loaded over the restraining elements and onto the core while providing the necessary restraining surfaces to restrict axial or longitudinal growth of the shirred stick on the core.

While a preferred embodiment of the invention has been described, various modifications would be within the skill of the art. For example, the restraining elements can extend over a greater length of the core and even from end-to-end. In cases where the casing does not tightly grip about the core, increasing the length of core provided with the restraining elements will aid in restricting axial growth of the casing along the core.

Also while restraining elements at both the aft end and the fore end of a core are only shown in combination with a core having an integral sizing means (FIG. 2), it should be understood that such a double set of restraining elements also can be used on cores which do not have an integral sizing means.

The same restraining effect could also be achieved by modifying the configuration of the restraining means. For example, the surface of the tubular core could be provided with the flexible scale-like members. The scales would be oriented so as to lie flat to the core surface when the compacted casing is loaded onto the core and then would flex away from the core surface to resist casing expansion.

Having thus described the invention in detail, what is claimed as new is:

1. A tubular core suitable for use as a sleeve to be mounted over a stuffing horn or for use as a disposable stuffing horn of a stuffing machine, and disposed on the tubular core a shirred casing stick having the pleats thereof in gripping engagement about the tubular core, and the tubular core having an aft end and a fore end and having on an aft end portion thereof means permitting the one way passage of the shirred casing stick onto the tubular core over said aft end portion;

said means providing said aft end portion with a generally serrated profile, each serration of which is formed by a first surface extending outward from the tubular core and inclined in a direction towards said fore end of the tubular core, and a second surface which is more normal to the tubular core than said first surface, and said second surface comprising a part engageable against the pleats of an adjacent part of the shirred casing stick for resisting the longitudinal movement of said pleats along the tubular core towards said aft end.

2. A tubular core for carrying a shirred casing stick and suitable for use as a disposable stuffing horn of a stuffing machine or as a sleeve to be mounted over a stuffing horn, the tubular core having an aft end portion and a fore end over which fore end can be drawn for stuffing a deshirred length of a said shirred casing stick, and said aft end portion of the tubular core having a serrated profile formed by a plurality of ramp-shaped elements spaced along said aft end portion, each of said ramp-shaped elements including a first surface slanting outward with respect to the longitudinal axis of the tubular core in a direction towards said fore end and a second generally upright surface extending substantially normal to the longitudinal axis of the tubular core, said second surface being engageable against a part of a said shirred casing stick on the tubular core so as to resist longitudinal growth of a said shirred casing stick in an aft direction along the tubular core, and said tubular core aft end portion and said ramp-shaped elements together defining an outside diameter which is small enough to permit a said shirred casing stick to pass over said aft end and said ramp-shaped elements when loading a said shirred casing stick onto the tubular core in a direction over said aft end and towards said fore end.

3. A tubular core for carrying a shirred casing stick and suitable for use as a disposable stuffing horn of a stuffing machine or as a sleeve to be mounted over a stuffing horn, the tubular core having an aft end and a fore end over which fore end can be drawn for stuffing a deshirred length of a said shirred casing stick and spaced along fore end and aft end portions of the tubular core, a plurality of elements each having an upright surface engageable against a part of a said shirred casing stick on the tubular core for resisting longitudinal casing stick growth in fore and aft directions, respectively, along the tubular core, and the outside diameter of said tubular core aft end portion including said elements being small enough to permit a said shirred casing stick to pass over both said tubular core aft end and said elements thereon for loading a said shirred casing stick onto the tubular core in a direction over said aft end and towards said fore end.

4. A tubular core as in claim 2 or 3 wherein each of said ramp-shaped elements is annular and extends about the periphery of the tubular core.

5. A tubular core as in claim 2 or 3 wherein each of said ramp-shaped elements on said tubular core aft end portion is annular and extends about the periphery of the tubular core.

6. A tubular core as in claim 1 or 2 including a casing sizing means on the tubular core at the fore end thereof.

7. A tubular core as in claim 3 including a sizing means on the tubular core fore end portion at a location forward of said ramp-shaped elements on said fore end portion.

* * * * *